Feb. 9, 1965    W. A. LEDWITH ET AL    3,168,807
NUCLEAR ROCKET FLOW CONTROL
Filed Aug. 8, 1961    4 Sheets-Sheet 2
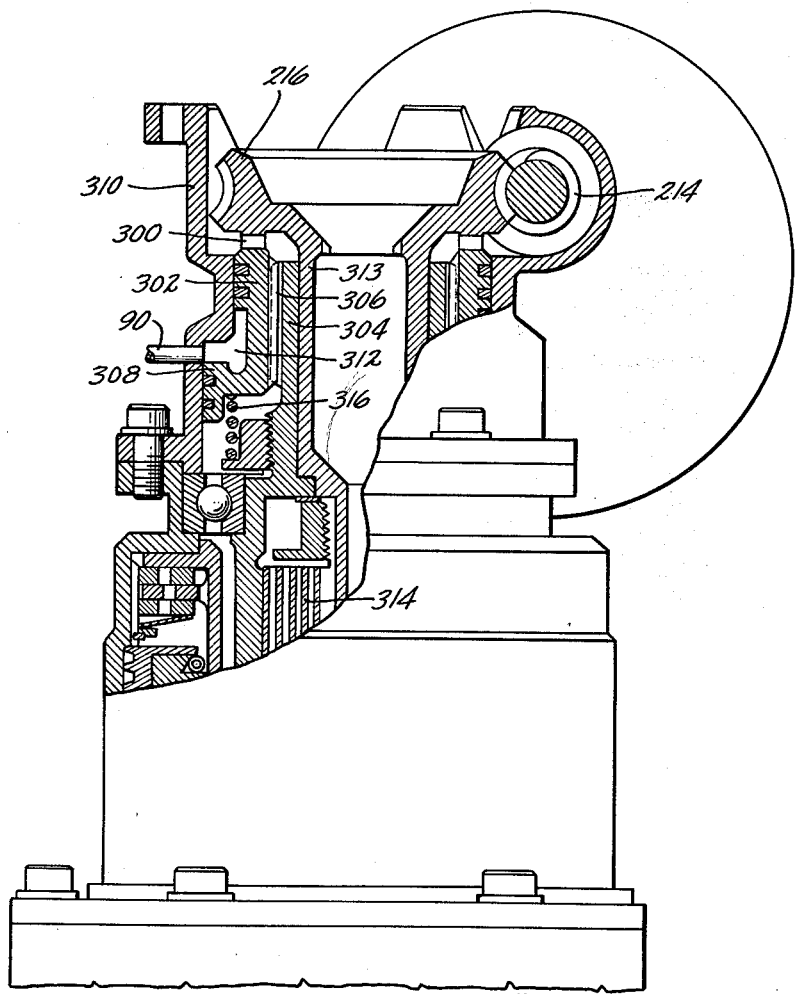
FIG.6
FIG.2
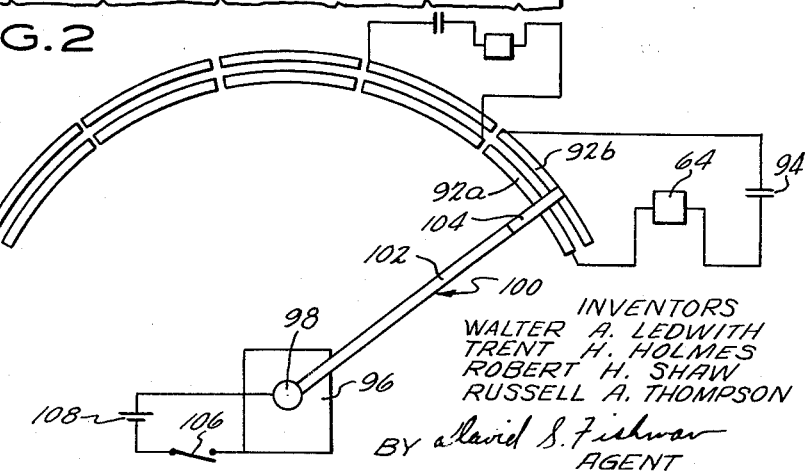
INVENTORS
WALTER A. LEDWITH
TRENT H. HOLMES
ROBERT H. SHAW
RUSSELL A. THOMPSON
BY David S. Fishman
AGENT

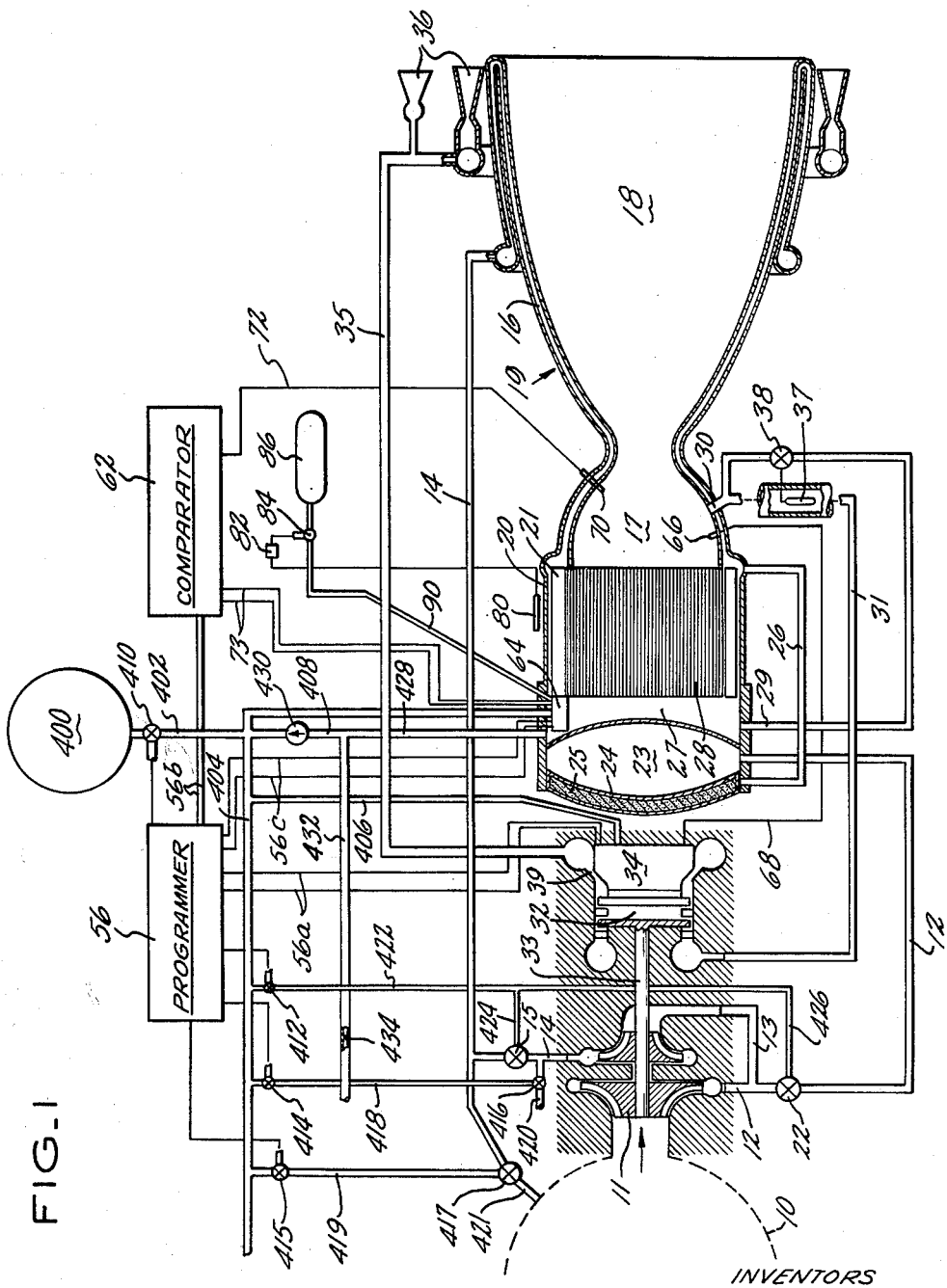

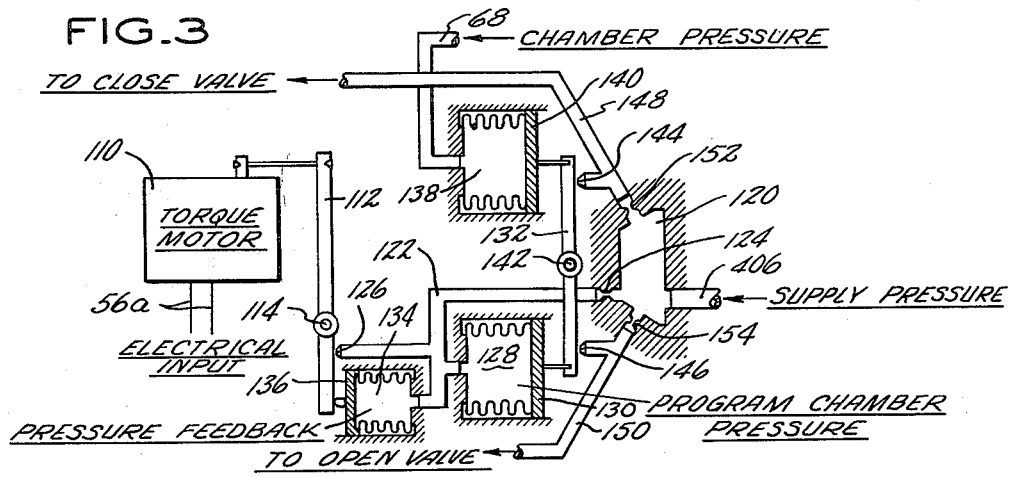
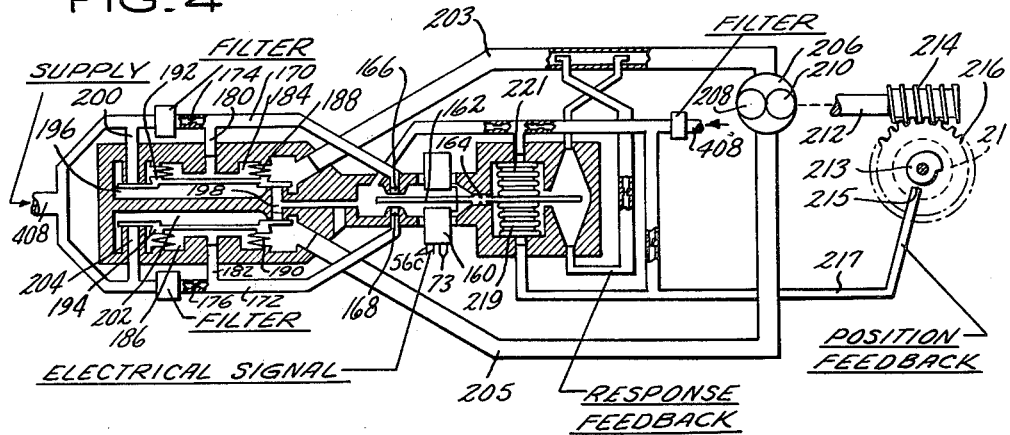
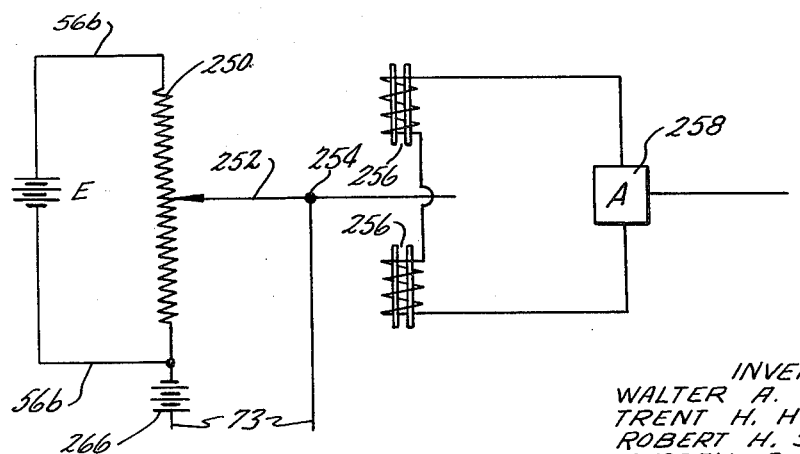

Feb. 9, 1965 W. A. LEDWITH ETAL 3,168,807
NUCLEAR ROCKET FLOW CONTROL
Filed Aug. 8, 1961 4 Sheets-Sheet 4

INVENTORS
WALTER A. LEDWITH
TRENT H. HOLMES
ROBERT H. SHAW
RUSSELL A. THOMPSON
BY David S. Fishman
AGENT United States Patent Office 3,168,807
Patented Feb. 9, 1965

3,168,807
NUCLEAR ROCKET FLOW CONTROL
Walter A. Ledwith, Glastonbury, Trent H. Holmes, Rocky Hill, and Robert H. Shaw and Russell A. Thompson, East Hartford, Conn., assignors to United Aircraft Corporation, East Hartford, Conn., a corporation of Delaware
Filed Aug. 8, 1961, Ser. No. 131,707
12 Claims. (Cl. 60—35.3)

This invention relates to a nuclear rocket engine. More particularly, it relates to a novel flow and control system for a nuclear rocket engine in which a part of the propellant is used to cool the thrust chamber, and in which a part of the propellant is mixed with hot gas from the thrust chamber and the mixture used to power the propellant pump turbine.

In previous rocket engine designs a propellant has been circulated in a cooling jacket around the thrust chamber to be heated and to cool the walls of the thrust chamber. The heated propellant has then been used to power the turbine drive for the propellant pump. In one such scheme, known as the expander cycle, all of the propellant passes through the cooling jacket, then flows to the turbine or some is bypassed around the turbine for control purposes, and the propellant then flows to the thrust chamber. This requires that all of the propellant be raised to a pressure level sufficient to endure the pressure losses throughout the entire flow path and still arrive at the thrust chamber at a substantial pressure level.

Increasing the size and thrust level of such an engine requires an increase in the propellant flow and hence an increase in the size of the pumps and turbines necessary to raise the entire amount of propellant to the required pressure level. A further problem arises in that the surface area of the cooling jacket, and hence the surface area available for heat transfer, does not increase as rapidly as the cross-sectional area of the thrust chamber increases, nor as rapidly as the increased propellant flow requirements. Thus, it becomes increasingly difficult to add enough energy to the propellant in the cooling jacket to operate the larger size pumps required for the larger engine.

The present invention eliminates these problems by departing from the expander cycle, and the present invention teaches a unique bleed cycle of optimum efficiency in which products in the thrust chamber are bled therefrom and used to power the pump turbine. According to the teachings of the present invention, a two-stage pump is employed; the part of the propellant discharged from the second stage of the pump is circulated in the cooling jacket to cool the thrust chamber; part of the propellant discharged from the first stage of the pump is or may be used to cool other engine components; the parts of the propellant from both stages are joined and mixed upstream of the thrust chamber, heated, and then delivered to the thrust chamber; hot gas from the thrust chamber is bled therefrom, and is mixed with a portion of the previously mixed propellants bled from a point upstream of the thrust chamber; and this second mixture is expanded through the pump turbine and then exhausted overboard through auxiliary nozzles to produce added thrust and/or vectoring control.

In the present invention the highest pressure which the pump must generate is a pressure sufficient to flow part of the propellant through the cooling jacket and thence to the combustion chamber. This is considerably less than the pressure level needed in an expander cycle wherein the propellant circulating through the cooling jacket must sustain a pressure drop through the turbine before being delivered to the thrust chamber.

The other part of the propellant need only be raised to a pressure level sufficient for it to flow to the thrust chamber after passing through any engine components which it is used to cool.

Bleeding gas from the thrust chamber, cooling this bled material to a usable level, and then expanding it through the turbine to drive the pump produces the significant advantage that material of the highest energy level in the system is used to power the turbine. Hence, an extremely high efficiency is obtained in powering the turbine in that a large energy supply is available in a small amount of turbine power fluid. Furthermore, the material bled from the thrust chamber is still devoted to thrust generating purposes by being exhausted through auxiliary nozzles after being expanded through the turbine.

Accordingly, one feature of the present invention is a novel propellant flow and control system in which the propellant from one stage of a two-stage pump is used to cool the thrust chamber.

Another feature of the present invention is a novel propellant flow and control system in which hot gas is bled off from the thrust chamber and used to drive the propellant pump.

Still another feature of the present invention is a novel propellant flow and control system in which hot gas is bled from the thrust chamber, cooled, and used as a turbine power fluid.

Still another feature of the present invention is a novel propellant flow and control system in which hot gas is bled from the thrust chamber, cooled, and used as a turbine power fluid, the composition of the turbine power fluid being regulated and controlled in accordance with the temperature of the turbine power fluid.

Still another feature of the present invention is a novel propellant flow and control system in which propellant from one stage of a two-stage pump is used to cool the thrust chamber, propellant from the other stage of a two-stage pump is used for other cooling purposes, the two propellants are mixed, and the mixture used to cool bled combustion chamber gas by mixing therewith to provide a power fluid to drive the pump.

Still another feature of the present invention is a novel propellant flow and control system for a nuclear rocket engine in which propellant flow, reactor power level and thrust chamber temperature are established by a programmer, and propellant flow and reactor power level are regulated and controlled as a function of thrust chamber pressure and thrust chamber temperature, respectively.

Other features and advantages will be apparent from the specification and claims, and from the accompanying drawings which illustrate an embodiment of the invention.

FIG. 1 is a schematic diagram of a nuclear rocket engine incorporating the propellant flow and control system of the present invention.

FIG. 2 is a detail of the programmer of FIG. 1.

FIG. 3 is a detail of the flow control of FIG. 1.

FIG. 4 is a detail of the control portion of the drum control and actuator of FIG. 1.

FIG. 5 is a detail of the temperature comparator of FIG. 1.

FIG. 6 is a detail of the actuator portion of the drum control and actuator of FIG. 1.

Figure 7:
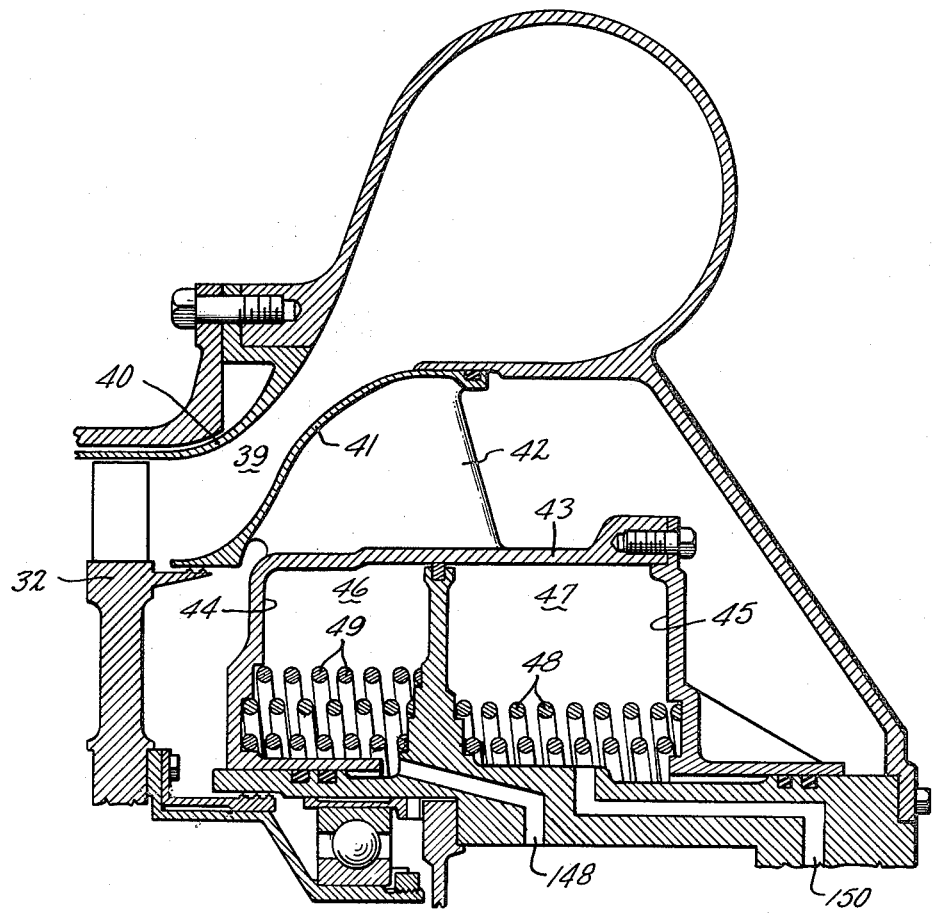
FIG. 7 is a detail of the turbine throttle valve of FIG. 1.

Referring to FIG. 1, the flow of propellant in the rocket engine with which the present propellant flow and control system is concerned is as follows: Liquid hydrogen from tank 10 is pressurized and delivered from the first stage of two-stage pump 11 to conduit 12. Part of the hydrogen in conduit 12 flows through conduit 13 to the second stage of two-stage pump 11 where it is additionally pressurized and delivered to conduit 14.

This part of the hydrogen then flows through shut off valve 15 in conduit 14 and to cooling jacket 16 which surrounds both convergent chamber 17 and divergent chamber 18 in rocket thrust chamber 19 in heat exchange relationship. The hydrogen in cooling jacket 16 is heated by the heat absorbed from the hot gases in chambers 17 and 18, thereby cooling the walls of chambers 17 and 18. The hydrogen then flows through annular chamber 20 and around reactor control drums 21 located therein to serve the further purpose of cooling the control drums.

Reference will now be made to the remaining part of the hydrogen discharged from the first stage of pump 11, i.e., the part not flowing through conduit 13. This part of the hydrogen passes through shut off valve 22 in conduit 12, and then flows through and cools shield 23 which is a tank in which the high density hydrogen acts as a neutron moderator. This part of the hydrogen then passes through opening 24 and then through gamma shield 25 to cool gamma shield 25 which is made up of sheets of depleted uranium having flow passages therethrough for the flow of hydrogen. The details of the shield structure are shown in copending application Serial No. 111,129, filed May 16, 1959, which is assigned to the assignee of the present invention and to which reference is hereby made for the details of the shield construction. This part of the hydrogen then flows from gamma shield 25 through conduit 26 to chamber 20 where it joins with and mixes with that part of the hydrogen which flowed from the second stage of the pump to cooling jacket 16. This mixture of the two parts of the hydrogen then flows from chamber 20 to chamber 27 and thence through the core of reactor 28 where it is further heated and then discharged through chambers 17 and 18 to be expanded to provide thrust. A part of the mixture in chamber 27 is bled therefrom to conduit 29 to be used in a manner to be described below.

A part of the heated hydrogen in chamber 17 is bled therefrom to conduit 30. This material bled from chamber 17 to conduit 30 is at an extremely high temperature, and it is joined by and mixed with the hydrogen in conduit 29 to produce a mixture at a lower temperature which can be used as a power fluid for a turbine without damage to the turbine elements or the ducting leading to the turbine. Reference is hereby made to copending application Serial No. 112,830, filed May 26, 1961, now Patent No. 3,134,224, which is assigned to the assignee of the present invention, for the details of the structure used in bleeding material from chamber 17 and producing a mixture at a usable temperature.

The mixture formed from combining the material bled from chamber 17 with the mixture bled from chamber 27 is delivered by conduit 31 to turbine 32 which is drivingly connected to pump 11 by shaft 33. Throttle valve 34 in the discharge passage 39 of turbine 32 controls the flow through turbine 32 in a manner to be described below, and the power fluid is expanded through turbine 32 to drive pump 11. The power fluid is then delivered by conduit 35 to auxiliary nozzles 36 and is expanded therethrough for added thrust or for vectoring purposes.

A fluid-filled temperature bulb 37 is located in conduit 31 and senses the temperature of the mixture in conduit 31. Bulb 37 communicates with valve 38 in conduit 29 and regulates the amount of the mixture in conduit 29 which is delivered to be mixed with the material bled from chamber 17. In this manner the constituents of the mixture in conduit 31 is altered and the temperature of the mixture in conduit 31 is maintained at a substantially constant value which is preferably as high as is suitable for powering turbine 32 without thermal damage to the turbine. The temperature of the mixture in conduit 29 is substantially below the temperature in chamber 17. Hence, if the mixture in conduit 31 rises above the desired level, valve 38 will be positioned to deliver a greater amount of the mixture in conduit 29 to form the mixture within conduit 31, and if the mixture in conduit 31 falls below the desired temperature valve 38 will be moved to deliver a lesser amount of the mixture in conduit 29 to form the mixture in conduit 31.

Programmer 56 functions throughout the period of operation of the engine to deliver signals of programmed operation preformance levels to turbine throttle valve 34, comparator 62, and drum control and actuator unit 64 via wires 56a, 56b, and 56C, respectively. These programmed signals establish the desired operational levels of the engine control components throughout the range of engine operation for start-up, steady state performance and shut down procedures.

The programmed signal to turbine throttle valve 34 controls the area of turbine discharge passage 39, thereby regulating the output of turbine 32 and hence controlling hydrogen flow from pump 11 to thrust chamber 19. The pressure in chamber 17 is an indication of actual hydrogen flow, and this pressure is transmitted by pressure sensor 66 and line 68 to turbine throttle valve 34 to modify and adjust the area of discharge passage 39 to maintain the desired propellant flow.

The programmed signal to drum control and actuator 64 positions control drums 21 and establishes the desired power level of the reactor. The programmed signal to comparator 62 is an indication of the temperature level in chamber 17 which should accompany a programmed level of reactor power. The temperature level in chamber 17 is sensed by a thermocouple type temperature sensor 70 and is transmitted via wire 72 to comparator 62 where it is amplified and compared with the programmed temperature signal, and comparator 62 delivers a signal to drum control and actuator 64 via wires 73 to adjust the position of control drum 21 and modify the power level of reactor 28 to maintain the desired temperature level.

A further control feature is provided in an ion chamber system consisting of ion chamber 80 and amplifier 82 which is calibrated to sense a high rate of change of reactor power level, hence sensing sudden large excursions in reactor power level. The signal generated by this ion chamber system actuates solenoid valve 84 to deliver a supply of pressurized helium from storage bottle 86 to drum control and actuator 64 via line 90 to override the drum control and drive control drums 21 to the shut down position.

*Programmer*

Referring to FIG. 2, a detail of programmer 56 is shown. A plurality of bus bars 92a and 92b are arranged in arcuate form. Each pair of bus bars 92a and 92b is connected to a battery 94, the voltages of the several batteries 94 being of different levels. In the bank of bus bars shown, each battery 94 is connected to drum control and actuator 64. A clockwork mechanism 96 drives an insulated shaft 98 on which is mounted a wiper arm 100 having an insulated portion 102 and a conducting portion 104. Closing of switch 106 connects battery 108 to clock mechanism 96 to rotate shaft 98 and move wiper arm 100 across the successive pairs of bus bars 92a and 92b. Conducting portion 104 closes the circuit between the pair of bus bars with which it is in contact to deliver a voltage signal to drum control and actuator 64. It should be apparent that as conducting portion 104 contacts successive pairs of bus bars, the voltage supply to drum control and actuator 64 will vary. Programmer 56 consists of a group of bus bar banks such as described immediately above, separate banks communicating with the turbine throttle valve 34, drum control and actuator 64 and comparator 62. Thus it should be apparent that programmed signals can be delivered to turbine throttle valve 34, drum control and actuator 64, comparator 62 and any other control locked in a predetermined position of programmed reactor power level.

Referring now to FIG. 6, gear 216 is rotated by worm 214 in the manner described above. A spline 300 connects gear 216 to an annular sleeve 302, and sleeve 302 is in turn connected to annular sleeve 304 by spline 306. Control drum 21 is attached to sleeve 304. An annular piston 308 extends from sleeve 302, and piston 308 and sleeve 302 cooperate with housing 310 to form an annular chamber 312 to which conduit 90 leads. Another annular sleeve 313 depends from gear 216 and is capable of rotation relative to sleeve 304, and a coil spring 314 extends between and is connected to both sleeves 313 and 304.

Spring 316 normally holds sleeve 302 in splined engagement with gear 216, and hence movement of gear 216 is normally transmitted through spline 300, spring 302, sleeve 306 and sleeve 304 to drive control drum 21. If reactor 28 should experience a serious, sudden excursion above the programmed power level, the ion chamber system consisting of ion chamber 80 and amplifier 82 will sense this high rate of change of power level and will deliver a signal to open valve 84. The opening of valve 84 will deliver a supply of pressurized helium via conduit 90 to chamber 312 which will move piston 308 against spring 316 thereby disengaging spline 300 and disconnecting sleeve 302 from gear 216. Since gear 216 and worm 214 are of the irreversible type, gear 216 and sleeve 313 will be held fixed, and spring 314 will drive sleeve 304 and hence control drum 21 to the full poison or reactor shut down position. Thus, the high rate of change of power level sensed by this ion chamber system actuates a scram mechanism which overrides the programmed power level for the reactor as determined by programmer 56 and operates in emergency situations to drive control drums 21 to the reactor shut down position. It will be understood that there are a number of drum control and actuator units 64 in the system, one for each control drum 21.

*Comparator*

Referring to FIG. 5, a signal is delivered to temperature comparator 62 via wires 56b, contemporaneously with the signal delivered via wires 56c to drum control and actuator 64. The signal delivered to comparator 62 is a measure of the temperature which should exist in chamber 17 as a result of the power level of reactor 28 called for by the signal delivered from programmer 56 to drum control and actuator 64.

Comparator 62 consists of a voltage divider made up of resistor 250 and a wiper arm 252 pivoted at 254, an electromagnet 256, and an amplifier 258 which receives signals from temperature sensor 70 via wires 72 and energize electromagnet 256. Amplifier 258 is calibrated to move wiper arm 252 in a clockwise direction for temperatures sensed by thermocouple 70 above a selected reference temperature, in a counterclockwise direction for temperatures below this reference temperature. The deviation of wiper arm 252 from null position as shown, either in a clockwise or counterclockwise direction, will depend on the degree to which the temperature sensed by thermocouple 70 differs from the arbitrarily selected temperature used to bias the output of amplifier 258.

The voltage signal delivered from programmer 56 to resistor 250 via wires 56b will be a constant at any one time and is represented in FIG. 5 by a battery of E volts. The voltage E is a signal of the desired temperature within chamber 24, and resistor 250 is calibrated so that a voltage X is picked off resistor 250 when that desired temperature is reached. A battery 266 of X volts is placed in one of the wires 73 to generate a current opposed to the current generated in wires 73 by the voltage divider. Thus, when the desired temperature exists in chamber 17, no current will pass through wires 73, and hence no signal will be delivered to torque motor 160.

If the temperature in chamber 17 deviates from the programmed level, wiper 252 will be moved to vary the voltage picked off by wiper 252 and hence a current will pass through wires 73 to torque motor 160 to actuate drum control 64. An increase in the temperature in chamber 17 results in movement of wiper 252 in a clockwise direction about pivot 254 to increase the voltage picked off by wiper 252 to produce a current in wires 73 from the positive terminal of battery 266 to the negative terminal thereof internally of the battery. Conversely, if the temperature in chamber 17 drops below the desired level, then wiper 252 will be rotated in a counterclockwise direction to decrease the voltage picked off by wiper 252 and hence generate current in wires 73 from the positive to the negative plates of battery 266 externally of the battery.

When programmer 56 calls for a different temperature within chamber 17, a different voltage $E_1$ will be delivered via wires 56b to resistor 250. In the present embodiment, $E_1$ will be increased over E when a higher temperature is described in chamber 17. As this higher temperature is approached within chamber 17, wiper 252 will be moved around pivot 254 in a clockwise direction toward the positive terminal of resistor 250, and hence it should be apparent that resistor 250 can be calibrated so that the voltage X is picked off whenever the temperature in chamber 17 is at the desired level. Conversely, when the voltage $E_1$ is less than E, this being the situation when a lower temperature is programmed for chamber 17, wiper 252 will be rotated in a counterclockwise direction about pivot 254 and the signal will be delivered to drum control 64 via wires 73 until the voltage picked off by wiper 252 is equal to the voltage X of battery 266.

*Operation*

Prior to starting the rocket engine, control drums 21 will be in the full poison position and reactor 28 will be shut down. Valve 410 will be closed to prevent the flow of hydrogen supply pressure to turbine throttle valve 34 and drum control and actuator 64; valve 412 will be closed to prevent the flow of hydrogen actuating pressure to shut off valves 15 and 22, and hence valves 15 and 22 will be closed; valves 414 and 415 will be closed to prevent the flow of hydrogen actuating pressure to cool down valve 416 and afterheat removal valve 417. Liquid hydrogen from tank 10 will surround two-stage pump 11 and will fill conduits 12 and 14 up to shut off valves 22 and 15, respectively.

The operation of the rocket engine is initiated by closing switch 106 to actuate clockwork mechanism 96. The bus bars in programmer 56 are so arranged that solenoid valve 410 is first actuated to allow pressurized hydrogen from tank 400 to flow through conduits 402 and 404 to deliver supply pressure to throttle valve 34 via conduit 406 and to drum control 64 via conduit 408. Programmer 56 next delivers a signal to drum control 64 via wires 56c to move control drums 21 toward the reflecting position at a preset rate. A signal is then delivered from programmer 56 to solenoid valve 414 to open valve 414 for a predetermined short period of time. When valve 414 is opened, pressurized hydrogen flows from conduit 404 through branch conduit 418 to open cooldown valve 416 to flow hydrogen through pump 11 to cool it and overboard through conduit 420. After a predetermined time has elapsed, the signal will be removed from valve 414 and valve 416 will close to end the cooling flow. A signal is then delivered from programmer 56 to open solenoid valve 412, and pressurized hydrogen then flows from conduit 404 to conduit 422 and branch conduits 424 and 426 to open shut valves 15 and 22.

Upon the opening of shut off valves 15 and 22, the hydrogen flows through the core of reactor 28 to chambers 17 and 18 in thrust nozzle 19 in the manner previously described to be expanded to produce thrust. The components such as solenoid valves in any predetermined manner and timed relationship according to the position and length of the bus bars.

Turbine throttle valve

The details of turbine throttle valve 34 and the control unit therefor are shown in FIGS. 7 and 3, respectively. The details of the turbine throttle valve and the control therefor form the subject matter of copending application Serial No. 106,096, filed April 27, 1961, now Patent No. 3,071,345, and copending application Serial No. 106,095, filed April 27, 1961, respectively, both of which are assigned to the assignee of the present invention, and reference is hereby made thereto for a more complete detailed description of the operation thereof.

Referring to FIG. 7, the discharge passage 39 of turbine 32 is formed by a stationary annular outer wall 40 and a moveable inner wall 41 which constitutes a throttle valve. The wall 41 is connected by struts 42 to a double-acting piston 43, the faces 44 and 45 of which are pressurized by the introduction of pressurized fluid to chambers 46 and 47, respectively. Springs 48 urge piston 43 to the right and springs 49 urge piston 43 to the left. When no actuating fluid is present in either chamber 46 or 47, piston 43 assumes the position wherein the forces of springs 48 and 49 are equalized. This establishes an area for passage 39 corresponding to the nonactuated position of piston 43.

A signal from programmer 56 is transmitted to torque motor 110, FIG. 3, to position flapper 112 which is pivoted at 114. Hydrogen under pressure is stored in tank 400, FIG. 1, and is supplied by conduit 402, branch conduit 404 and conduit 406 to chamber 120, FIG. 3, and thence to conduit 122. Conduit 122 has a fixed restriction 124 at one end thereof and a variable area orifice 126 at the other end thereof, the size of variable area orifice 126 being determined by a position of flapper 112. The electrical signal which positions flapper 112 establishes a reference pressure in conduit 122 which is indicative of the desired pressure in chamber 17. The pressure in conduit 122 is delivered to the interior of bellows 128 to position the free end 130 thereof and impose a force on flapper 132 which is an indication of the desired pressure level in chamber 17. Pressure in conduit 122 is also delivered to the interior of bellows 134, the free end 136 of which is in contact with flapper 112 as a feedback device. The actual pressure in chamber 17 is transmitted via conduit 68 to the interior of bellows 138 to move the free end 140 thereof and impose a load on flapper 132 which is a measure of the actual pressure in chamber 17. Flapper 132 is pivoted at 142 and moves about pivot 142 to vary the areas of orifices 144 and 146 in conduits 148 and 150, respectively. Conduits 148 and 150 have fixed restrictions 152 and 154 therein, respectively. If the pressure in chamber 17 as sensed by bellows 138 differs from the programmed chamber pressure as sensed by bellows 128, flapper 132 will be pivoted to vary the areas of orifices 144 and 146 and hence change the pressures in conduits 148 and 150.

If the pressure in chamber 17 should rise above the desired level, thereby indicating an excess propellant flow to chamber 17, flapper 132 will be rotated in a clockwise direction to increase the pressure of the actuating fluid in conduit 148 and decrease the pressure of the actuating fluid in conduit 150. This will cause an increase in pressure in chamber 46 and a decrease in pressure in chamber 47, and piston 43, and hence throttle valve 41, will be moved to the left to reduce the area of discharge passage 39. Reducing the area of passage 39 will reduce the flow through turbine 32, thereby reducing the output of turbine 32, and hence decrease the pressure in chamber 17 by reducing the amount of hydrogen delivered from pump 11. Conversely, if the pressure in chamber 17 falls below the programmed level, the pressure in chamber 46 will be reduced and the pressure in chamber 47 will be increased thereby moving piston 43 and throttle valve 41 to increase the area of discharge passage 39. The increased area of discharge passage 39 increases the flow through turbine 32 to increase the output of turbine 32, and hence increase the pressure in chamber 17 by increasing the amount of hydrogen delivered from pump 11.

The electrical signals from programmer 56 to torque motor 110 establish the programmed area for turbine discharge passage 39 and hence regulate the flow of propellant to chamber 17. The pressure in chamber 17 is directly proportional to propellant flow, and any variations in propellant flow from the programmed level will be sensed by bellows 138 and will result in changes in the area of discharge passage 39 in the manner described above. These area changes regulate and control the output of turbine 32 and hence the output of pump 11 and control and maintain propellant flow at the desired programmed level.

Drum control and actuator

The details of drum control and actuator 64 are shown in FIGS. 4 and 6. These control components form the subject matter of copending applications Serial No. 111,124, filed May 8, 1961, now Patent No. 3,141,383, and Serial No. 113,990, filed May 29, 1961, both of which are assigned to the assignee of the present invention and to which reference is hereby made for a more detailed description.

Referring to FIG. 4, programmer 56 transmits an electrical signal of desired reactor power level to torque motor 160 via wires 56c. This signal causes flapper 162 to move about pivot 164 to vary the areas of orifices 166 and 168 in conduits 170 and 172, respectively. Conduits 170 and 172 have fixed restrictions 174 and 176 therein, and these conduits are supplied with pressurized hydrogen from tank 400 via conduits 402 and 408, see FIG. 1. Branch conduits 180 and 182 downstream of the fixed restrictions lead to chambers 184 and 186 which are formed by bellows 188 and 190. Disc-shaped end plates 194 are attached to the free ends of bellows 188 and 190, respectively. Bellows 188 and disc 192 are contained within chamber 196, and disc 192 serves to close off chamber 196 both from vent 198 and from branch conduit 200 upstream of fixed restriction 174. Similarly, bellows 190 and plate 194 are contained within chamber 202 and disc 194 serves to close off chamber 202 from vent 198 and conduit 204 upstream of fixed restriction 176.

Movement of flapper 162 in response to the signal delivered to torque motor 160 via wires 56c will cause an increase in pressure in one of the chambers 184 and 186 and a decrease in pressure in the other of the chambers. Assuming that chamber 186 experienced an increase in pressure, disc 194 will be rotated about its contact with vent conduit 198 to connect branch conduit 204 to chamber 202 to deliver high pressure helium to chamber 202. Simultaneously, a decrease in pressure in chamber 184 will cause disc 192 to rotate about its contact with conduit 184 to connect chamber 196 to vent conduit 198 thereby reducing the pressure in chamber 196. The increased pressure in chamber 202 and the decreased pressure in chamber 196 will cause a flow through conduits 203 and 205 through gear motor 206 to rotate gears 208 and 210. The rotation of one of the gears is transmitted by shaft 212 to worm 214, and worm 214 drives gear 216 to which control drum 21 is attached in the manner to be described below. Movement of gear 216 also positions feedback cam 213 to vary the area of orifice 215 in conduit 217. Varying the size of orifice 215 varies the pressure supplied to bellows 219. Bellows 219 and 221 are both supplied from line 408, and constitute a force feedback system to return flapper 162 to the null position thereby terminating the flow in conduits 203 and 205. Worm 214 and gear 216 are of the irreversible type so that the cessation of flow to gear motor 206 will result in a cessation of the rotation of shaft 212, and worm 214 and gear 216, and hence control drum 21, will be liquid hydrogen from the second stage of pump 11 flows through conduit 14 through cooling jacket 16 and thence through chamber 20 and through the core of reactor 28, and part of the liquid hydrogen from the first stage of pump 11 flows through conduit 12 to shields 23 and 25 and thence to chamber 20 where it mixes with the hydrogen flowing in cooling jacket 16. The flowing hydrogen is evaporated and expanded both by the ambient heat contained in the units through which it flows and by being heated in the core of reactor 28, and a bled mixture is delivered through conduit 31 to power turbine 32 in a bootstrap manner, the driving fluid passing through the turbine causing a greater delivery of propellant to chamber 17 from which the turbine power fluid is extracted. The bootstrap operation of the pumping system is controlled by turbine throttle valve 34 to regulate the acceleration of the pumping system and to establish and maintain the steady state operating condition as is determined by programmer 56.

The pressure in chamber 17 is a measure of propellant flow, and this pressure is fed to turbine throttle valve 34 to be compared with the programmed signal from programmer 56, and the position of turbine throttle valve 34 is adjusted to regulate the speed of pump 11 to maintain the desired propellant flow.

A signal representing the actual temperature in chamber 17 is delivered to comparator 62 which in turn delivers a signal to drum control and actuator 64 via wires 73 to adjust the position of control drums 21 to maintain the programmed temperature within chamber 17.

An emergency shut down is provided through ion chamber 80 and amplifier 82 which are calibrated to sense a sudden, large rate of change in reactor power level and activates solenoid valve 84 to deliver a scram signal to chamber 312 of drum control and actuator 64 to drive the control drums to the shut down position.

If it is desired to do so, a second ion chamber system can be incorporated to sense a sudden, relatively mild rate of change of reactor power and deliver a controlled shut down signal to torque motor 160 of drum control and actuator 64.

Conduit 428 communicates with chamber 27, and the pressurized hydrogen in chamber 27 is bled through conduit 428 and through check valve 430 to replenish the hydrogen in tank 400 which was used during start up. Solenoid valve 410 is closed either at a predetermined time after engine start up or at the initiation of engine shut down so that the supply in tank 400 can be preserved for further starts, and hydrogen is bled from chamber 27 via conduit 428 and conduit 404 for use as a supply pressure to operate the various control components during steady state engine operation. Also, the pressure in chamber 27 is delivered via conduit 432 to the top of tank 10 as an additional pressurizing source for the hydrogen in tank 10, the tank pressurization being regulated by orifice 434 in conduit 432.

In a normal shut down procedure, programmer 56 will deliver signals to turbine throttle valve 34 to close the throttle valve as a function of time to a point where the turbo pump stalls. From the turbo pump stall point on in time control 64 will be programmed to move control drums 21 toward the full poison or shut down position as a function of time. At the turbo pump stall point, programmer 56 will deliver signals to simultaneously close solenoid valve 412 and open solenoid valve 415. The closing of valve 412 will remove the hydrogen pressure signal from conduit 422 and results in the closing of shut off valves 15 and 22 to prevent further hydrogen flow through either stage or pump 11. The opening of solenoid valve 415 results in the delivery of a hydrogen pressure signal via conduit 419 to open afterheat removal valve 417. Valve 417 is located in conduit 421 which extends from tank 10 to conduit 14 at a point downstream of valve 15. Hence, the opening of valve 417 provides a continued flow of hydrogen through the portion of conduit 14 downstream of valve 15, and thence via cooling jacket 16, chamber 20, chamber 27, through the core of reactor 28 to thrust chamber 19. This hydrogen flow continues for a predetermined period of time and serves to remove the residual heat from reactor 28 and thrust chamber 19 and prepare the engine for another cycle of operation. This flow of hydrogen is maintained by virtue of the pressure created within tank 10 resulting from boil-off of hydrogen within tank 10. After a predetermined period of time, programmer 56 will deliver a signal to close valve 415 and hence close valve 417 and end the afterheat removal flow. Switch 106 will then be opened, and the engine will be primed for another cycle of operation.

It is to be understood that the invention is not limited to the specific embodiment herein illustrated and described but may be used in other ways without departure from its spirit as defined by the following claims.

We claim:

1. In a propellant flow and control system for a rocket engine having a thrust chamber and a cooling jacket surrounding said thrust chamber, a source of propellant, means for pumping said propellant including a two-stage pump, means for driving said pumping means, means for delivering a first part of said propellant from said second stage of said pumping means to said cooling jacket, means communicating with said cooling jacket to receive said first part therefrom, means for delivering a second part of said propellant from said first stage of said pumping means to said receiving means to mix said first and second parts, means including heating means for delivering said mixture to said thrust chamber at an increased temperature, means for bleeding a part of said mixture upstream of said heating means, means for bleeding a part of said mixture from said thrust chamber, and means for mixing said bled parts and delivering said mixture of bled parts to said pump driving means to power said pump driving means.

2. A propellant flow and control system as in claim 1 including means responsive to a condition of the mixture of bled parts for controlling the mixture of bled parts.

3. A propellant flow and control system as in claim 1 including means responsive to a condition of said mixture of bled parts for controlling the amount of one of said bled parts delivered to the mixture of bled parts, and means responsive to thrust chamber pressure to regulate the flow of said first part of said propellant to said cooling jacket.

4. A propellant flow and control system as in claim 1 including means responsive to the temperature of the mixture of bled parts for controlling the mixture of bled parts, and control means responsive to a condition of said mixture downstream of said heating means for controlling the output of said heating means.

5. In a propellant flow and control system for a nuclear rocket engine having a thrust chamber and a cooling jacket surrounding said thrust chamber, and a nuclear reactor upstream of said thrust chamber, a source of propellant, a two-stage pump for pumping said propellant, means for driving said pump, means for delivering part of the propellant from the first stage of said pump to the second stage of said pump, means for delivering said part of the propellant from the second stage of said pump to said cooling jacket, means including conduit means for delivering said part of said propellant from said cooling jacket through said reactor to said thrust chamber, means for delivering the remaining propellant from said first stage pump to said conduit means to mix the propellant from the first stage and the second stage of said pump, means for bleeding a part of said mixture upstream of said reactor, means for bleeding a part of said propellant from said thrust chamber, means for mixing said bled parts and delivering said last-mentioned mixture to said driving means, means responsive to the temperature of said last-mentioned mixture for controlling the composition of said last-mentioned mixture, a throttle valve downstream of said driving means, and means responsive to a pressure in said thrust chamber for positioning said throttle valve to control the flow of said last-mentioned mixture through said driving means.

6. A propellant flow and control system as in claim 5 including means for establishing a programmed opening of said throttle valve, means for establishing a programmed power level of said reactor, and means responsive to a temperature in said thrust chamber for modifying the power level of said reactor.

7. A propellant flow and control system as in claim 5 including means for establishing a programmed opening of said throttle valve, means for establishing a programmed power level of said reactor, and means responsive to the rate of change of reactor power level for shutting down said reactor.

8. In the method of generating thrust in a rocket engine, the steps of pressurizing a first part of a propellant, using said first part as a heat sink, pressurizing a second part of the propellant to a level below the pressure level of the first part, mixing said first and second parts after the first part is used as a heat sink, heating said mixture, expanding said mixture to produce thrust, bleeding a part of said mixture prior to heating, bleeding a part of said mixture after heating, mixing said bled parts, and utilizing said mixture of bled parts to pressurize said propellant.

9. The method of claim 8 including the further steps of sensing the temperature of said mixture of bled parts, and regulating the composition of said mixture of bled parts as a function of the temperature of said mixture of bled parts.

10. The method of claim 8 including the further steps of sensing the temperature of said mixture of bled parts, and controlling the amount of one of the bled parts delivered to said mixture of bled parts as a function of the temperature of said mixture of bled parts.

11. A propellant flow and control system as in claim 1 wherein said heating means is a nuclear reactor and including means responsive to the temperature of the mixture of the bleed parts for controlling the amount of one of said bleed parts delivered to the mixture of bleed parts, control means responsive to a condition of said mixture downstream of said heating means for controlling the output of said heating means, and means responsive to the rate of change of the power level of said reactor operative to override said control means.

12. A propellant flow and control system as in claim 11 and including a programmer comprising means to dispatch signals corresponding to desired thrust chamber temperature and pressure, and means to compare actual thrust chamber temperature to said signal temperature and regulate reactor power level when a difference occurs and means to compare actual thrust chamber pressure with said pressure signal and regulate the flow of said propellant first part to said cooling jacket when a difference occurs.

References Cited by the Examiner
UNITED STATES PATENTS

| | | | |
|---|---|---|---|
| 2,676,456 | 4/54 | Holzwarth | 60—35.6 |
| 3,028,729 | 4/62 | Ledwith | 60—35.6 |
| 3,033,774 | 5/62 | Crever | 204—193.2 |
| 3,082,600 | 3/63 | Williamson et al. | 60—35.6 |
| 3,093,562 | 6/63 | Zinn | 204—154.2 X |

OTHER REFERENCES

"Dynamic Analysis of a Nuclear Rocket Engine System," by Bernard R. Felix and Richard J. Bohl, ARS Journal, November 1959, pages 853–862.

SAMUEL LEVINE, *Primary Examiner.*

SAMUEL FEINBERG, ABRAM BLUM, *Examiners.*